Dec. 23, 1969   C. S. NORDGARD   3,485,372
SYSTEM FOR BIOLOGICAL PURIFICATION OF WASTE WATER, PRIMARILY
SEWAGE, AND REMOVAL OF NUTRITIVE SALTS FROM THE
PURIFIED WASTE WATER

Filed May 17, 1968                                2 Sheets-Sheet 1

Inventor:
Carl Sigvard Nordgård
By: B. Ishleinger
Attorney

Dec. 23, 1969  C. S. NORDGARD  3,485,372
SYSTEM FOR BIOLOGICAL PURIFICATION OF WASTE WATER, PRIMARILY
SEWAGE, AND REMOVAL OF NUTRITIVE SALTS FROM THE
PURIFIED WASTE WATER
Filed May 17, 1968  2 Sheets-Sheet 2

Inventor:
Carl Sigvard Nordgard
By: W. Schlesinger
Attorney

United States Patent Office 3,485,372
Patented Dec. 23, 1969

3,485,372
SYSTEM FOR BIOLOGICAL PURIFICATION OF WASTE WATER, PRIMARILY SEWAGE, AND REMOVAL OF NUTRITIVE SALTS FROM THE PURIFIED WASTE WATER
Carl Sigvard Nordgard, Becksjudarvagen 41, Nacka, Sweden
Filed May 17, 1968, Ser. No. 730,079
Claims priority, application Sweden, May 23, 1967, 7,215/67
Int. Cl. C02c 1/02; B01d 12/00, 33/34
U.S. Cl. 210—150                    4 Claims

ABSTRACT OF THE DISCLOSURE

In a sewage treatment tank a plurality of endless belts are mounted to travel one within the other about spaced, parallel rollers so that the upper reach of at least the outermost belt projects above the level of the liquid in the tank. A plurality of generally flat, rectangular pocketed plates project from the outer surface of each belt in spaced rows, with the plates in each row disposed in closely spaced, parallel planes extending in the direction of travel of the belt, and normal to the roller axes. The pockets in the plates continuously pick up and expose fluid from within the tank to the air above the level of the liquid in the tank, whereby the overall biological treating surface afforded by the closely spaced plates may be extremely large for a given tank size.

---

This invention relates to a system for biologic purification of waste water, primarily sewage, and removal of nutritive salts from the purified waste water.

Systems for biologic purification of waste water, primarily sewage, by means of so-called dipping cylinders or rollers are described in literature and used in practice. The system operating with dipping or immersion beds differs from other biologic purification systems mainly therein that the microbes which by their activity purify the waste water from organic substance, grow on the surface of cylindrical discs which are mounted onto a shaft which is rotated by means of a motor. The discs are immersed to half-way or more in the waste water. For this reason the microbes will for a period be located inside the waste water where they absorb organic material and for another period above the water surface where they have access to the activating oxygen from the air.

The drawback inherent to these systems is, however, that the disc can be used in relatively small purifying plants only treating a little quantity of water because their basin must be of semi-cylindrical cross-section in order to have the microbes on the discs become active in the entire body of water. For structural and economical reasons it is impossible to manufacture discs having a larger diameter than about 4 meters.

One main object of the present invention is completely to eliminate these drawbacks by providing a system which can be used in all existant types of basins, great or small, with rectangular or part-circular cross-section.

A further object of the invention is to provide a system which renders it possible to reconstruct with great economic gain low-degree purification plants such as of the "Emscher"-type utilized in many, primarily European, countries so as to operate with a very high purification effect with regard to both removal of organic substances and reduction of content of nutritive salts.

Further objects and advantages of the invention will become apparent from the following description, considered in connection with the accompanying drawings which form part of this specification, and of which:

Figure 1:
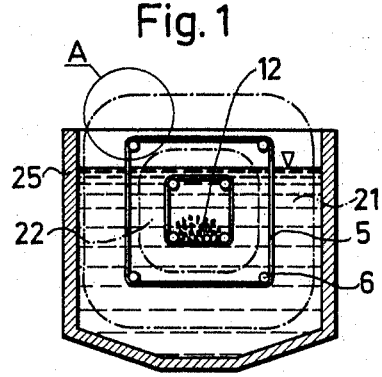
FIG. 1 is a vertical section through a conventional low-degree sewage purification plant reconstructed into a high-degree purification plant according to the invention.
Figure 2:
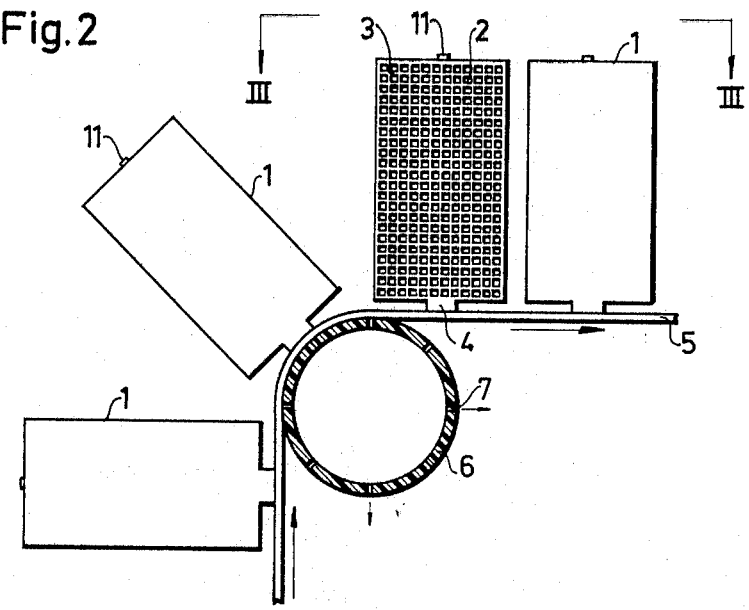
FIG. 2 is a part-sectional view on a highly enlarged scale of the encircled portion denoted A of FIG. 1.
Figure 3:
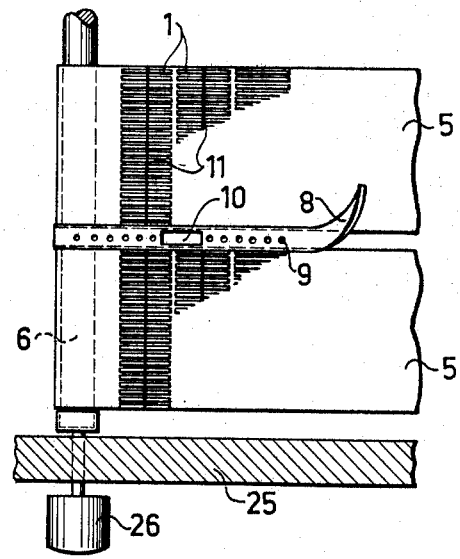
FIG. 3 is a part-sectional top view following lines III—III of FIG. 2.

Referring now to the embodiment of the invention illustrated in FIGS. 1, 2 and 3, a basin or tank of a typical low-degree sewage plant generally denoted 25 and assumed to be of the Emscher-type is fitted with a plurality of purifying aggregates or immersion beds embodying the invention.

In the embodiment shown in FIG. 1 the aggregate is composed of two immersion beds which are disposed concentrically and generally denoted 21 and 22. Each of the immersion beds is mounted about four preferably tubular shafts or turn rolls 6. These aggregates, which preferably are prefabricated at a workshop for flow-line production, are composed of the following parts which best are seen in FIG. 2, in which reference numeral 1 designates generally flat plates made of foamed plastic material or some other suitable material which is not attacked by the sewage or other waste water. In order to offer a large surface to the microbes to grow upon and at the same time to save material and to reduce weight each plate is provided with ribs 3 encasing apertures 2 evenly distributed over the entire surface. The plates 1 are mounted closely adjacent one another along the whole circumference of an endless belt 5 made of synthetic plastic, synthetic rubber or some other similar, very flexible material. The belt 5 shown in FIG. 2 does not cover the entire basin 25 viewed perpendicularly to the plane of FIG. 1 in a single piece but an immersion bed comprises a plurality of such belts of minor breadth located side by side as is shown in FIG. 3. In order to prevent the plates 1 from loosening from the belt 5 due to the change in travel direction caused by their passage over the tubular shafts 6, each belt is provided with a reduced attachment portion 4. The shafts are manufactured of synthetic plastic or some other resistive and rigid material and are at their ends inserted into collars or sockets (not shown) which are provided with bearing members for reducing the friction to a minimum when the shafts are rotated. The collars or sockets are in turn fixed on the opposed walls of the basin 25, of which one is shown in part in FIG. 3, in such a manner that they can be displaced in a vertical direction in order to stretch the belt taut upon assemblage so that it will be sufficient to rotate one shaft only in each aggregate to cause all shafts in the two aggregates shown in FIG. 1 to rotate with the same speed. For this purpose a collar or socket or similar member is rigidly attached to one shaft end wherefrom a prolongation passes through the basin wall to a motor space where a conventional driving device connects both shafts which then can be rotated from one single motor 26, as is illustrated in FIG. 3. The belts can be advanced with a rotational speed of about 1 to 2 revolutions per minute. Since these belts which consist of a material extensible to some extent can become elongated and for this reason could slide on the shafts, the tension is suitably retained by means of springs or other structural details (not shown) acting on the tube attachment which is movable in a vertical direction. The motor thus can actuate both immersion belts 5 so that the microbes which grow on the plates 1 absorb organic substance from the sewage or waste water and receive oxygen from the air when they emerge. The highest level of the sewage or waste water must therefor not be higher than the upper surface of the uppermost shafts in the interior system of belts to make sure that the direct oxygen supply from the air be effective.

In order to present the greatest possible surface area, the plates are also attached side by side with a spacing no greater than required by the growing mass of microbes (normally about 2 centimeters) in the manner evident from FIG. 3 which shows a portion of the two belts viewed from above. In order to render easier the passage through the water and to make possible the flow of water therethrough the edges of the belts are not mounted tightly adjacent one another but with a spacing therebetween. By arranging two and, if desired, more aggregates or immersion beds one inside the other, it becomes possible to treat a very great portion of the sewage or waste water for which reason the drawbacks connected with the low capacity of the normal immersion rollers are eliminated. In the plant illustrated in FIG. 1 the sewage within the zone indicated by broken lines can be purified biologically.

If for some reason the plates 1 must be made very high the danger is imminent that they may cant and a contact between them may be established so that the spacing between them becomes too narrow. This can be avoided by rigidly attaching a strip or lath 11 on the upper portion of all plates which are positioned side by side in mutually parallel relationship.

When having long basins with small width and highly contaminated water it is advantageous—also from the biochemical viewpoint—to have several such systems coupled in sequence or adjacent one another but separated from one another by settling basins for deposition of sludge formed by the purification treatment. Research has ascertained that the period of stay for the sewage or waste water in each immersion bed must not exceed 3 to 4 hours because the microbes after said period absorb but very little organic substance, and instead produce nutritive salts which create a secondary contamination when they reach the recipient.

Figure 5:
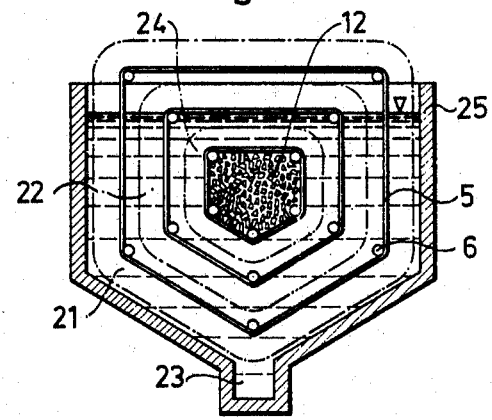
FIGS. 4 and 5 are similar vertical sections as shown in FIG. 1 through two other purification plants embodying the invention.
Figure 4:
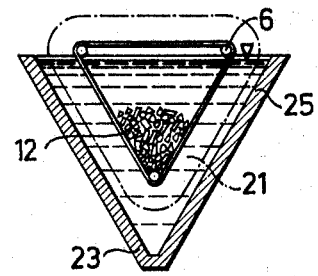

When building new basins with purifying aggregates according to the same principle a suitable basin shape for minor plants can have the shape shown in FIG. 4 and for greater plants the shape indicated in FIG. 5. Due to the sharp inclination of the bottoms all sludge is collected in the bottom groove 23 and will easily be removed by means of a sludge sucking means or the like insertable into said groove.

The number of tubular shafts or rolls 6 about which each belt 5 is stretched shall according to the invention be at least 3 as is shown in FIG. 4. In FIG. 5 three immersion beds 21, 22, 24 are mounted concentrically relatively to one another in the vertical plane, but of course the number of beds can be still greater, especially in great plants. If then the innermost immersion bed or beds are constantly or mostly below the water level, the supply of oxygen to the microbes can be effected by injection of air in a manner to be described below.

Hitherto, the principles and realization of the plant for the biological purification proper have been described whereas the reduction of formation of nutritive salts, which also is an important object of the invention, has not been intimated otherwise but by pointing out the short period of stay of the sewage in each aggregate. There are, however, large quantities of nutritive salts present in the sewage and waste water which originate from washing agents in the form of phosphates etc., and in addition it cannot be avoided that a considerable quantity of nutritive salts is formed in the biochemical purification process for which reason the problem of removal of nutritive salts from the "purified water" discharged from a purification plant has gradually become highly annoying in many countries.

When water rich in nutritive salts is discharged into a lake or some other recipient or receiver a very strong increment of algae or seaweed and the like will be caused which consumes oxygen and causes such a shortage in oxygen in the water that aneorobe bacterie predominate and finally pollute the water. It is therefore necessary to relieve the discharged waste water from nutritive salts as far as possible. Research work has revealed that there are different bacterial strains which in varying manners purify the waste water. There are microbes which can absorb the nutritive salts into their cellular substance provided that there is sufficient carbon substrate in the water for assistance. The sewage from the households contains normally very little of carbon containing substances; for which reason it is necessary to in some way add substances rich in carbon in order to render the work of the microbes easier.

The present invention has solved this problem in the following manner: The interspace between the belts 5 in the innermost immersion bed is covered by narrow band 8 (FIG. 3) which is provided with smaller apertures 9. At one place of the band is a larger aperture 10, which can be covered. It is possible to introduce through said aperture 10 carbonaceous material in the form of charcoal, peat dust, bark, cellulose etc. into the central space indicated at 12 in FIG. 1. When a sufficient quantity of the carbonaceous material corresponding to the content of nutritive salts has been introduced, the aperture 10 is covered so that the material cannot come out again prior to an opening of the aperture 10 for exchange of consumed carbonaceous material. The water can flow in and out through the apertures 9 in the band 8, but said apertures have been dimensioned so that the carbonaceous material does not follow the water on its way out. The supply of oxygen to the peat dust (peat litter) is effected by injecting air through the end of one or several tubular shafts 6. The air then escapes through holes 7 in the shafts and supplies the peat dust with oxygen. It is also possible to place one or several tubes within the body of peat dust and inject the air through them. A combination of these expedients can be employed which may be suitable if also the microbes on the plates 1 are to be supplied with oxygen in case they do not receive oxygen directly from the ambient air. In order to prevent the peat dust from escaping at the ends of the tubular shafts 6 a thin partition wall is inserted at the ends of the shafts 6 where the belt terminates. This partition wall is provided with apertures for the aerating tubes. In the embodiment described hereinbefore comprising several systems of immersion beds coupled in sequence and separated by sedimenting basins, each immersion bed may contain said carbonaceous material or, if judged to be the better solution, the innermost purifying aggregate in the last group of immersion beds may be discarded and the large space inside the outer purifying aggregate may then be filled with carbonaceous material. All possibilities are open with the system of the present invention and which one of these possibilities is to be utilized in each individual case will depend on the content in the sewage or waste water of various organic and chemical substances.

Still another possibility of supplying carbonaceous material to the purifying process is to deposite such material in those gutters through which the water must flow to come to the various sections of the purifying plant. In this case the supply of oxygen can be effected through direct contact with the oxygen of the air. The thickness of the material placed in the gutters must then the little or the material should consist of bits of charcoal or like larger pariculate material which can be in good contact with the air.

Due to the fact that the external immersion bed 21 is longer than the immersion beds 22 and 24, respectively, located inside thereof it is to be preferred to drive them at a speed which is in inverse ratio to the length of the belts so that the period for the supply of oxygen to the microbic strains when they are above the water level becomes substantially equally long such as 50 to 60 seconds or more.

What I claim is:
1. A sewage-purifying system comprising
   a tank for sewage including liquid inlet and outlet means,
   at least one movable endless belt,
   a plurality of spaced rows of generally flat plates mounted on the outer surface of said belt and having opposed generally plane surfaces oriented in the direction of travel of said belt and perpendicular to said outer surface,
   means mounting said belt in said tank for travel in an endless path in which said plates travel both through the liquid in said tank and the atmosphere above said liquid so that in the travel through the atmosphere any material picked up from the liquid by said plates is exposed to atmosphere,
   drive means for advancing said belt along said path,
   said flat plates being rectangular in configuration, and
   the plates of each row being closely spaced from one another, and from the plates of adjacent rows to form a space between adjacent rows, so that the plates of one row do not overlap and project between the plates of another row.

2. A sewage purifying system as defined in claim 1, wherein
   each of said plates has therethrough a plurality of closely spaced apertures, and
   the plates in each row are spaced from one another approximately two centimeters and are aligned in the direction of travel of the belt with corresponding plates in the other rows.

3. A sewage purifying system comprising
   a tank for sewage including liquid inlet and outlet means,
   at least one movable endless belt,
   a plurality of spaced rows of generally flat plates mounted on the outer surface of said belt and having opposed generally plane surfaces oriented in the direction of travel of said belt and perpendicular to said outer surface,
   means mounting said belt in said tank for travel in an endless path in which said plates travel both through the liquid in said tank and the atmosphere above said liquid so that in the travel through the atmosphere any material picked up from the liquid by said plates is exposed to atmosphere,
   drive means for advancing said belt along said path,
   at least a second endless belt mounted within the space enclosed by said one endless belt, and
   means mounting said second belt for travel in an endless path disposed within and spaced from the first-named path,
   said second belt having projecting from its outer surface a plurality of spaced rows of flat members having their opposed plane surfaces extending in the direction of travel of said second belt and perpendicular to the outer surface thereof.

4. A sewage purifying system comprising
   a tank for sewage including liquid inlet and outlet means,
   at least one movable endless belt,
   a plurality of spaced rows of generally flat plates mounted on the outer surface of said belt and having opposed generally plane surfaces oriented in the direction of travel of said belt and perpendular to said outer surface,
   means mounting said belt in said tank for travel in an endless path in which said plates travel both through the liquid in said tank and the atmosphere above said liquid so that in the travel through the atmosphere any material picked up from the liquid by said plates is exposed to atmosphere,
   drive means for advancing said belt along said path,
   said mounting means comprising at least three spaced, parallel, roll members,
   said belt being guided to travel about said three roll members and
   at least one of said roll members being hollow and having therein a plurality of radial ports for delivering a gas containing oxygen to the space surrounded by said belt.

References Cited
UNITED STATES PATENTS

| | | | |
|---|---|---|---|
| 353,291 | 11/1886 | Denton | 261—80 X |
| 798,908 | 9/1905 | Kremer | 210—150 |
| 1,882,930 | 10/1932 | Roddy | 210—526 X |
| 2,781,310 | 2/1957 | Ram et al. | 210—526 X |
| 3,146,192 | 8/1964 | McClintock | 210—526 X |
| 3,335,081 | 8/1967 | El-Naggar | 210—150 X |

JAMES L. DECESARE, Primary Examiner

U.S. Cl. X.R.
210—220, 526; 261—80